United States Patent [19]

Earing

[11] 4,282,038
[45] Aug. 4, 1981

[54] COIL IMPREGNANT WITH MODIFIED ASPHALTITE BASE

[75] Inventor: Mason H. Earing, Danville, Ill.

[73] Assignee: General Electric Company, Schenectady, N.Y.

[21] Appl. No.: 733,432

[22] Filed: Oct. 18, 1976

Related U.S. Application Data

[62] Division of Ser. No. 614,320, Sep. 17, 1975, Pat. No. 4,022,635.

[51] Int. Cl.$^3$ ............................................. C08L 95/00
[52] U.S. Cl. .................................. 106/273N; 106/279
[58] Field of Search .................. 106/273 N, 278, 279, 106/281 N, 270, 272, 284; 208/21, 23; 331/272; 336/96

[56] References Cited

U.S. PATENT DOCUMENTS

| | | | |
|---|---|---|---|
| 290,057 | 12/1883 | Hyde | 106/279 |
| 1,101,281 | 6/1914 | Holmes et al. | 106/279 |
| 1,306,520 | 6/1919 | Burkley | 106/279 X |
| 2,501,149 | 3/1950 | Yellott | 208/21 X |
| 3,597,378 | 8/1971 | Kubiak et al. | 106/279 X |
| 3,660,126 | 5/1972 | Moran | 106/279 |

*Primary Examiner*—Theodore Morris
*Attorney, Agent, or Firm*—Lawrence R. Kempton

[57] ABSTRACT

A modified gilsonite based coil impregnant having improved sound suppression properties and rheologically controlled characteristics. In one form of the preferred embodiment, the gilsonite is modified by thermal depolymerization. In another form of the preferred embodiment, the gilsonite is modified by the addition of a process oil having a viscosity gravity constant of 0.97 and a viscosity in SSU at 100° C. of 48.4 and comprising 29-36% by weight of the oil-gilsonite composition. To approximately 75-80% of modified gilsonite is added about 20-25% by weight of ethylenediamine bisstearamide to produce a mixture having a softening point of from 125°-130° C. and a viscosity at 170° C. of from 78 to 118 centipoise.

2 Claims, 3 Drawing Figures

DAMPING VS TEMPERATURE
OIL-MODIFIED GILSONITE
2000 Hz PLATE

DAMPING VS TEMPERATURE
BLOWN ASPHALT
2000 Hz PLATE

COIL IMPREGNANT WITH MODIFIED ASPHALTITE BASE

This is a division of application Ser. No. 614,320, filed 9-17-75, now U.S. Pat. No. 4,022,635.

BACKGROUND OF THE INVENTION

1. Field of the Invention

The present invention relates to an encapsulating system useful in inductive electrical devices, and more particularly, to a potting compound and a coil impregnant useful in a ballast for at least one gaseous discharge lamp.

2. Description of the Prior Art

Asphaltic materials, usually in the form of blown asphalts, have been accepted as potting compounds and coil impregnants and are presently in general use. While satisfactory in many applications, asphaltic materials have many limitations and are definitely deficient for many other applications.

A potting compound is often used in conjunction with a metal receptacle for encapsulating transformers, inductors and the like which generally are characteristically small size components. The physical property requirements of and considerations for such a potting compound are diverse; while some essential properties can be compromised, a successful compound must embody at least minimal and preferably the highest standard, in each of the following areas:

1. Sound suppression—Highly important is the sound suppression characteristic. The material should have a high degree of sound suppression of the sound level which might accompany normal operation of the electrical device. The purpose is to convert the sound of operation of the device into heat which in turn is dissipated by the potting compound, an important property when applied, for instance, to a ballast for fluorescent lighting;

2. Thermal conductivity—The potting compound should have a high rate of heat transferability since it must convey heat as rapidly and efficiently as possible away from the working components of the electrical device which has been encapsulated;

3. Water imperviousness—The potting compound should be relatively unaffected by water and should protect the components from the adverse effects of water; possess a low viscosity and should be pourable so as to completely fill the receptacle and totally encapsulate the electrical component. Almost immediately, upon contact with the cooler surface of the component and receptacle, the viscosity should increase so that the potting compound will not "run out" of openings and, during normal operation, should not exude from the receptacle;

5. Dielectric stability—Once formed as a potting compound, the material which protects the components should exhibit a high degree of inertness to the atmosphere, humidity and temperature changes so that the encapsulated electrical components are adequately protected. Though dielectric properties need not be high, they should be comparable to those of blown asphalts.

6. Cost—The potting compound must be reasonably priced both as a raw material and in its finished form;

7. Ease of repair—The potting compound should be capable of being removed by scraping and digging if repairs to the electrical components are required;

8. Energy consideration—Blown asphalts are derived from petroleum oils by methods well known in the art; in light of the rapid world consumption of petroleum and the dwindling supplies thereof and ecological concern, it is desirable that the potting compound be wholly comprised of, or at least based upon, a material which is not a petroleum derivative.

A coil impregnant, in addition to embodying the properties set forth in paragraphs 1, 2, 3, 4, 5, 6 and 8 above, should conform desirably to the following:

1. Should be able to wet the coils and flow between the laminations and coil turns so as not to leave any air bubbles;

2. Should be solderable with rosin flux; ie., without having to strip, mechanically or chemically, the impregnant material from terminals and wires to be soldered; and 3. Should, during manufacture of the device, not produce vapors which are photochemically active or otherwise deleterious to the environment.

Upon consideration of these requirements, it becomes apparent why the art only rarely yields an improved encapsulating system and why the asphaltic materials have enjoyed such a high degree of acceptability for such a long time. The problem of how to obtain an improved encapsulating system, ie, potting compound and coil impregnant having improved sound suppression capabilities has persisted and is an indication of the unobvious nature of the present invention.

It is desirable therefore to provide an encapsulating system including a potting compound and a coil impregnant wherein the above properties are maximized.

Accordingly, it is an object of the present invention to provide a new and improved potting compound which will supply certain of the deficiencies of the asphaltic compounds and in particular, a higher level of sound suppression.

Another object of the present invention is to provide an encapsulating system including a potting compound and a coil impregnant which will be sufficiently economical, both as a starting material and in method of application: ie, basically not a petroleum derived product.

SUMMARY OF THE INVENTION

In accordance with the present invention, there is provided a potting compound including a modified asphaltite composition. The modified asphaltite has the following properties: a ring and ball softening point of from 90° to 125° C., a penetration at 25° C. with a 100 gram mass after 5 seconds of from 0-5 mm and a rheological value as measured at 200° C. on a Stormer Viscosimeter using a 400 gram mass of from 10-100 seconds for 100 revolutions. Also included is inert filler material having a size of from 20-325 mesh to the extent of from about 45-80% by weight of the mixture.

In another aspect of the invention, there is provided, in combination, an inductive electrical device having a plurality of electrical components mounted within a container member and a potting compound for potting the components in the container member. The potting compound includes a modified asphaltite composition having a softening point of from 90°-125° C., a penetration at 25° C. with a 100 gram mass after 5 seconds of from 0 to 5 mm, and a rheological value as measured at 200° C. in a Stormer Viscosimeter using a 400 gram mass of from 10-100 seconds for 100 revolutions. Also included in the potting compound is silica filler sized from 20-325 mesh to the extent of from about 45-80% by weight of the mixture.

In yet another aspect of the invention, there is provided an impregnating compound for electrical coils. Included is about 75-85% by weight of a modified asphaltite composition having a softening point of from 90°-105° C. and about 15-25% by weight of a wax or like material which will produce a resultant mixture having the following properties: a softening point of from 125°-135° C.; a penetration at 25° C. with a 100 gram mass after 5 seconds of from 5-20 mm; and a viscosity at 170° C. of from 70-125 centipoise.

DESCRIPTION OF THE PREFERRED EMBODIMENT

Figure 1:
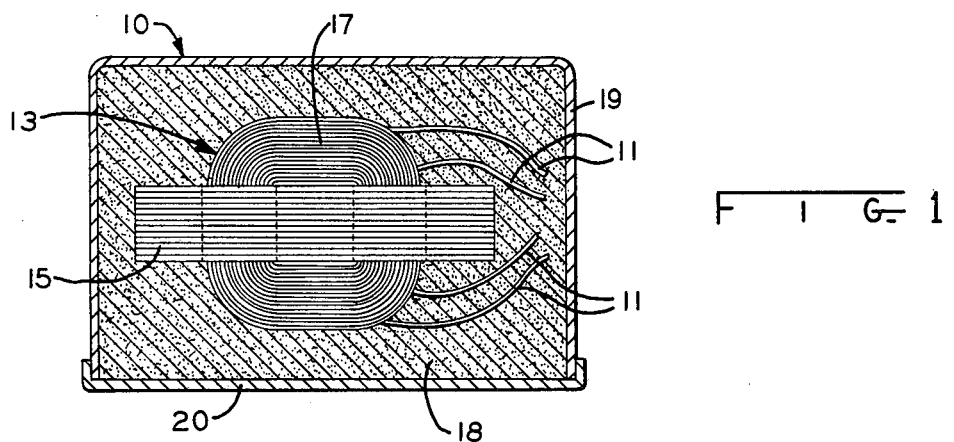
FIG. 1 is a cross-sectional view of a ballast for a gaseous discharge lamp, the ballast containing a potting compound and coil impregnant in accordance with the present invention.

Referring to FIG. 1, there is shown an inductive electrical device such as ballast 10 suitable for use with electrical and electronic equipment, and in particular, for ballasting at least one gaseous discharge lamp. Ballast 10 includes transformer 13 comprising a core 15 and a coil 17. Core 15 and the coil 17 are disposed within an outer ballast case 19 made of a suitable material such as metal, the components being spaced therefrom by means of the potting compound 18 of the present invention. The ballast case 19, a container member, is in the shape of a retaining box of magnetic sheet metal. The box is usually provided with a cover member 20 which may be removed to gain access to the components therein.

In accordance with one aspect of the present invention, there is provided a potting compound useful in such inductive electrical devices, the basic ingredient of which is a modified asphaltite composition, such as, for example, gilsonite, to which is added inert filler material. Asphaltites are natural asphalt-like substances characterized by their high fusing point: ie, over 100° C. They are grouped into three classes, namely: gilsonite, glance pitch, and grahamite. All are presumably derived from the metamorphosis of petroleum. Gilsonite, or uintaite under which name it is also known, is found in but one region, the Uinta Basin extending five miles east of the Colorado boundary to 60 miles westward into Utah.

Unfortunately, gilsonite as mined does not have the proper physical properties for the potting application. This is illustrated in Table I in which the Selects grade of gilsonite is compared with a blown asphalt of a type commonly used to formulate potting compounds.

TABLE I

| Physical Properties of Unmodified Gilsonite and Blown Asphalt | | |
|---|---|---|
| | Gilsonite Selects | Blown Asphalt |
| Softening Pt. - Ring and Ball (°C.) per | 152 | 107-114 |

TABLE I-continued

| Physical Properties of Unmodified Gilsonite and Blown Asphalt | | |
|---|---|---|
| | Gilsonite Selects | Blown Asphalt |
| ASTM-E28-58T Penetration, (mm) per ASTM-D5-52 25° C. 100 gm., 5 sec, 0.10 mm | 0-3 | 24-32 |
| Viscosity, 200° C., 100 revolutions Stormer (Sec) Stormer (Sec) | | |
| 200 gm. | (a) | 26-55 |
| 400 gm. | (a) | 13-27 |
| 700 gm. | (a) | 7-15 |

(a) Too viscous to measure

The blown asphalt has, in addition, the following properties:

| Flash Point, °F. min. | 525 |
|---|---|
| Firepoint, °F. min. | 560 |

This table shows that unmodified gilsonite is too viscous and has too high a softening point for formulation into satisfactory potting compound. By the present invention, gilsonite is modified in the preferred embodiments by one of two processes to give the composition the following physical properties: a softening point of from 90°-125° C. as measured with a shouldered ring in accordance with ASTM-E28-58T; a penetration at 25° C. with a 100 gram mass and a 0.10 mm needle, after 5 seconds, of from 0-5 mm, in accordance with ASTM-D5-52; and a rheological value as measured at 200° C. on a Stormer Viscosimeter using a 400 gram mass of from 10 to 100 seconds for 100 revolutions. One form of the preferred embodiment involves the addition of a suitable oil such as a process oil. To be satisfactory for this purpose, the oil must have low volatility and be fully compatible with the gilsonite. That is, the oil should not vaporize during impregnation or potting and in use, after potting or the like, should not volatilize to condense out on surrounding materials and apparatus. Furthermore, there should be no exudation with aging. An oil found to be adequate for this purpose is an aromatic process oil made by Shell Oil Company and sold under the trade name Dutrex 357. The addition of such oil to constitute about 15-30% by weight of the oil-gilsonite mixture is believed sufficient to provide a product approximating the properties of a suitable blown asphalt.

Following is a listing of some typical properties of Shell Dutrex 357:

| Viscosity, SSU/100° F. | 459 |
|---|---|
| Viscosity, SSU/210° F. | 48.4 |
| Specific Gravity/60° F. | 0.9772 |
| Flash Point, c.o.c., °F. | 395 |
| Pour Point, °F. | 35 |
| Volatility, 22 Hrs/225° F. % W | 0.4 |
| Viscosity-Gravity Constant | 0.970 |
| Refractive Index/20° C. | 1.5720 |

It is believed that any process or similar oil having a viscosity gravity constant greater than 0.90 and a viscosity in SSU at 100° C. of from 40 to 55 and which is added to the extent of from about 15 to 30% by weight of the oil-gilsonite mixture is satisfactory to produce, when added to the gilsonite, a composition having suitable physical qualities for use as a potting compound.

Another form of the preferred embodiment for modification of the gilsonite is thermal depolymerization or cracking. It is believed that when the gilsonite is heated at from 350° to 400° C. for 80 to 120 minutes in a nitrogen atmosphere, a product approximating a suitable blown asphalt is produced.

Those skilled in the art may recognize other methods of changing the viscosity of the gilsonite and such are intended to come within the coverage of the appended claims.

Samples of gilsonite were modified by the addition of Shell Dutrex 357 oil to the extent of about 21% by weight of the oil-gilsonite mixture as well as by depolymerization by heating the gilsonite at about 360° to 380° C. for 90 to 100 minutes in a nitrogen atmosphere; the physical properties of both modified gilsonites are compared with those of a suitable blown asphalt in Table II below.

TABLE II

Physical Properties of Modified Gilsonites and Blown Asphalt

| | Depolymerized Gilsonite | Oil Modified | Blown Asphalt |
|---|---|---|---|
| Softening Pt. (°C.) Ring and Ball per ASTM-E28 | 110 | 103 | 107–114 |
| Penetration (mm) per ASTM-D5, 25° C., 100 gm., 5 sec., 0.10 mm needle | 0–1 | 0–1 | 24–32 |
| Viscosity, 200° C. 100 revolutions, Stormer, (Sec) | | | |
| 200 grams | 50 | 84 | 26–55 |
| 400 grams | 23 | 41 | 13–27 |
| 700 grams | 12 | 21 | 7–15 |

To achieve a lower cost and to improve the thermal conductivity, the modified gilsonite to be used as a potting compound, for example, for gaseous discharge lamps, is mixed with an inert filler material, preferably finely divided silica having a size of from 20–325 mesh and to the extent of from about 45–80% by weight of the modified gilsonite-silica filler mixture. Any filler material which is substantially inert to the asphaltite and oil may be used provided it is an electrical insulator and a thermal conductor. Certainly materials such as Fuller's earth, diatomaceous earth, alumina and like materials may be used.

Samples were made wherein the depolymerized gilsonite and the oil-modified gilsonite were mixed with about 54% by weight of the 325 mesh silica. The ring and ball softening point of the depolymerized mixture was then measured as 117° C. and that of the oil-modified mixture was 120° C. These values are at the lower end of the range of 117° to 135° C. typical for suitable blown asphalts when mixed with this quantity of silica.

Five each of General Electric model 1022 ballast transformers (for use with F40T12 fluorescent lamps) were potted as seen in FIG. 1 in the oil-modified gilsonite formulation and five each were potted in the depolymerized formulation using the standard metal case for such ballasts. The core/coils were impregnated with an asphalt-wax impregnant based on a blown asphalt, the impregnant having the following properties:

| Softening Point, Ring and Ball | 127–135° C. |
|---|---|
| Penetration, 100 gm., 5 sec, 25° C. | 30–40 mm |
| viscosity 170° C., | |

| | |
|---|---|
| -continued | |
| | max 70 centipoise |

The ballasts were then sound tested at 102° C. in a standard fluorescent lamp fixture. The results are shown in Table III.

TABLE III

Sound Test of 1022 Ballast Potted in Modified Gilsonites 102° C.

| Oil Modified Gilsonite, (db) | Depolymerized Gilsonite, (db) |
|---|---|
| 12 | 11.5 |
| 13 | 16.5 |
| 17 | 17.5 |
| 16 | 14.0 |
| 10 | 12.0 |
| 13.6 av. | 14.3 av. |

Statistical tests failed to show a significant difference in these averages indicating that the oil-modified and the depolymerized gilsonites are equally satisfactory in their sound suppressing properties. Accordingly, the averages can be pooled to give a value of about 13.95 db for all ten samples and this value can be compared with the approximately 19.5 db monthly average of quality control audit tests on General Electric Model No. 1022 ballasts potted and impregnated with blown asphalt compositions. The sound improvement of 5.55 db corresponds to almost a fourfold decrease in sound power. Statistical analysis of the data showed that a 3 db difference in these averages could be expected at about 95% confidence level which corresponds to a twofold decrease in sound power.

In accordance with another aspect of the present invention, there is provided an impregnating compound for electrical coils based also upon an asphaltite, and in particular, gilsonite.

In one form of the preferred embodiment, the gilsonite is modified by depolymerization, this being accomplished by heating the material at 350°–380° C. for about 4–5 hours in a nitrogen atmosphere to yield a modified gilsonite having a softening point of 97° C., as measured per ASTM-E28-58T. Then, about 15–25% weight of a wax such as ACRAWAX CT (a trade name for ethylenediamine bisstearamide - produced by Glyco Chemical Co.), or like material which will produce the results outlined above, is added to 75–85% by weight of the depolymerized gilsonite. In a sample run, a formulation comprising about 80% by weight of gilsonite modified by heating at about 360° C. for 4.5 hours in a nitrogen atmosphere to which was added to about 20% by weight of ACRAWAX CT, yielded an impregnant having a viscosity of 83 centipoise at 170° C. as measured per ASTM-E28, and a dielectric strength of 1150 volts/mil (short time) as measured per ASTM-D176-56T.

In another form of the preferred embodiment, the gilsonite is modified by the addition of a suitable oil. It is believed that any oil having a viscosity gravity constant greater than 0.90 and a viscosity in SSU at 100° C. of from 40 to 55 when added to the extent of from about 29–36% by weight of the oil-gilsonite mixture will produce an impregnant having the desired properties as set forth in the preceding paragraph to which is added a suitable wax as outlined above. Shell Oil Co. Dutrex 357 was also used for this application. Table IV shows several formulations resulting from a sample run and the properties obtained.

TABLE IV

| Formulation | Gilsonite % (by wt.) | Oil % (by wt.) (a) | Wax % (by wt.) (b) | Viscosity 170° C. cps (c) | Penetration mm (d) | Softening Point, °C. (e) |
|---|---|---|---|---|---|---|
| #1 | 56 | 24 | 20 | 118 | 9 | 128 |
| 2 | 54 | 23 | 23 | 110 | 9 | 129 |
| 3 | 52 | 23 | 25 | 105 | 7 | 130 |
| 4 | 51 | 24 | 25 | 93 | 10 | 128 |
| 5 | 50 | 25 | 25 | 88 | 12 | 129 |
| 6 | 49 | 26 | 25 | 83 | 15 | 129 |
| 7 | 48 | 27 | 25 | 78 | 16 | 129 |

(a) Dutrex 357
(b) ACRAWAX CT (Ethylenediamine bisstearamide-Glyco Chemicals Co.)
(c) Brookfield Model HBT (#1 spindle)
(d) ASTM-D5-52
(e) ASTM-E28-58T These formulations correspond approximately to an oil-modified gilsonite with the addition of the same type of wax as is used with a suitable blown asphalt impregnant.

Those skilled in the art may recognize other methods of changing

Tests were run wherein General Electric Model No. 1022 ballasts were used, the coils 17 (as in FIG. 1) of which were impregnated in accordance with the process prescribed below for this model of ballast with an impregnant having the following formulation:

| Gilsonite Coil Impregnant | |
|---|---|
| Gilsonite | 49% by weight |
| Dutrex 357 oil | 26.6% by weight |
| ACRAWAX CT | 23.7% by weight |

The coils to be impregnated are heated to 170°–175° C., and are then immersed in the liquid impregnant which is maintained at about 180° C. The pressure in the impregnator is reduced to less than 6 mm Hg and is held at that point for 4 minutes. The vacuum is then released and the coils are allowed to soak at atmospheric pressure for 6 minutes. They are then removed from the impregnation bath and allowed to drain. The ballasts were then potted in the oil modified gilsonite potting compound formulated as above. After potting, the sound values were measured on a standard fluorescent lamp fixture at both room ambient and 107.5° C. The results are shown in Table V.

TABLE V

Comparison of Sound Values, Model 1022 Ballasts Oil-Modified Gilsonite

| Room Temperature (db) | 107.5° C. (db) |
|---|---|
| 22 | 8 |
| 19 | 4 |
| 24 | 13 |
| 22 | 12 |
| 20 | 7 |
| 21 | 5 |
| 24 | 12 |
| 25 | 12 |
| 23 | — |
| 22.2 db av. | 9.4 db av. |
| Standard Ballasts | |
| 21 | 15 |
| 21 | 24 |
| 19 | 15 |
| 19 | 18 |
| 22 | 14 |
| 19 | 16 |
| 20 | 14 |
| 19 | 16 |

TABLE V-continued

Comparison of Sound Values, Model 1022 Ballasts Oil-Modified Gilsonite

| Room Temperature (db) | 107.5° C. (db) |
|---|---|
| — | 17 |
| 20 db av. | 16.6 db av. |

It will be noticed that at the higher temperature, the improvement for the gilsonite impregnated and potted ballasts is 7.2 db average, or over a fourfold decrease in sound power. At room temperature, however, the gilsonite ballasts showed a slight increase in sound values of 2.2 db average.

Figure 2:
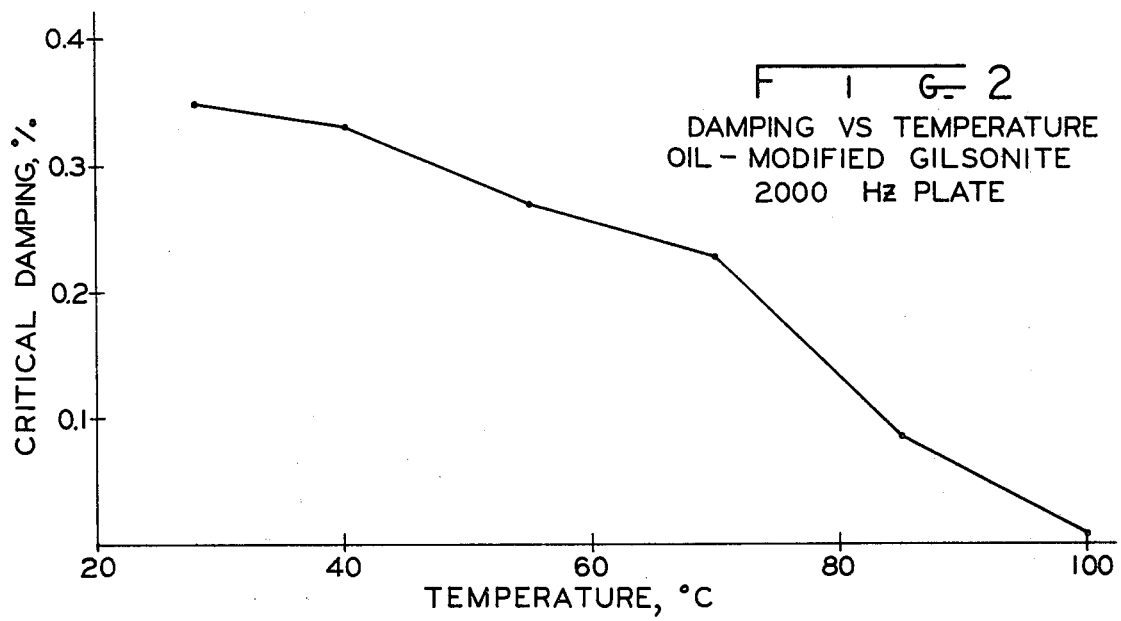
FIG. 2 is a graph showing vibration damping in which Critical Damping, % is plotted versus Temperature for oil-modified gilsonite.
Figure 3:
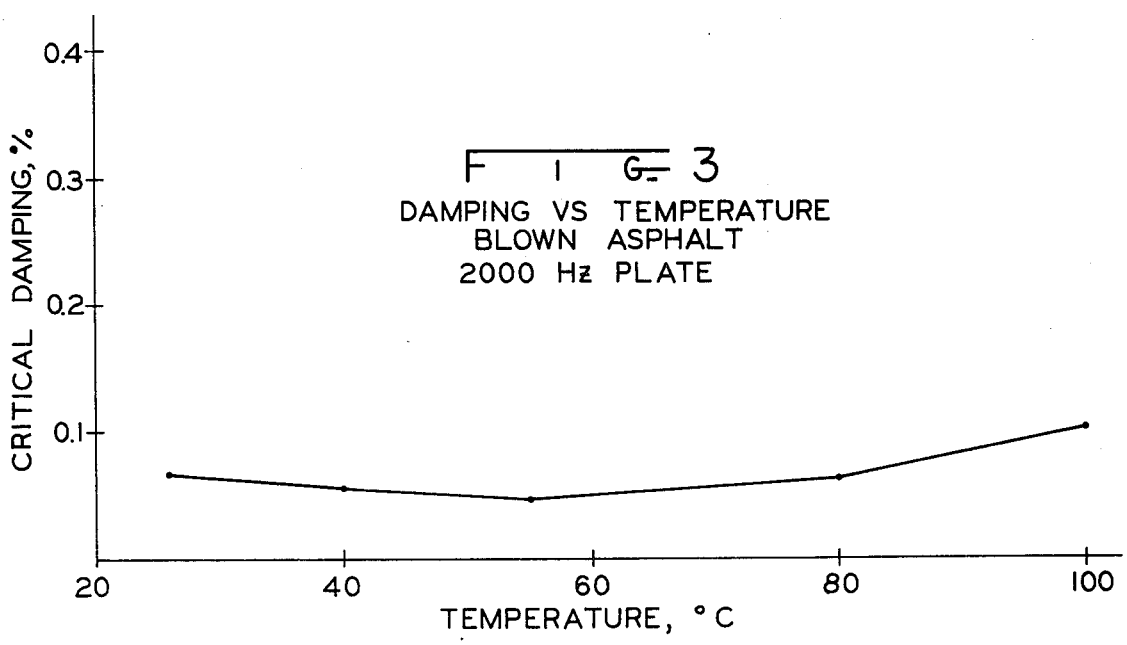
FIG. 3 is a graph showing vibration damping in which Critical Damping, % is plotted versus Temperature for a blown asphalt potting compound.

From a standard vibration theory, one would expect that the decrease in sound values observed at the higher temperature could be predicted from an increase in the vibration damping coefficient of the gilsonite and the blown petroleum asphalt. Both samples contained about 54% of the 325 mesh silica as the filler. The procedure used is described in military spec MILP22581A (SHIPS). In this test, the damping material is cast on 8" diameter steel plates of 2,000 Hz fundamental frequency. The damping factor is computed as the percent of critical damping. Graphs of these values for the oil-modified gilsonite and blown asphalt are shown in FIGS. 2 and 3 blown asphalt shows little change in this temperature range. This result emphasizes the totally unexpected aspect of the sound reduction achieved by the use of modified gilsonite as the potting compound and impregnating material for fluorescent lamp ballasts.

Since the compatibility of the asphaltic materials in the impregnant and potting compounds is of great importance, Kleinschmidt tests (Journal of Research of the National Bureau of Standards, Vol. 54, No. 3, March 1955; pp. 163–166) were conducted to estimate if this would be a problem. The results of these tests are shown in Table VI.

TABLE VI

Kleinschmidt Analysis

| | Asphaltenes | White Oils | Dark Oils | Asphaltic Resin | Soluble CHCl₃ Acetone |
|---|---|---|---|---|---|
| Blown Asphalt | 31.5 | 41.7 | 20.8 | 5.2 | 1.0 |
| Gilsonite (Unmodified) | 62.0 | 7.7 | 4.9 | 22.3 | .4 |
| Depolymerized Gilsonite | 65.7 | 10.6 | 5.7 | 10.8 | 2.8 |
| Oil-Modified Gilsonite | 60.9 | 25.1 | 6.4 | 6.2 | 1.8 |

The results indicate that incompatibility might result if the modified gilsonite materials were used with an asphaltic coil impregnant made from a suitable blown asphalt.

It should be apparent to those skilled in the art that the embodiments described heretofore are considered to be the presently preferred forms of the invention. In accordance with the Patent Statutes, changes may be made in the disclosed encapsulant and the manner in which it is used without actually departing from the true spirit and scope of this invention.

What I claim as new and desire to serve by Letters Pat. in United States is:

1. An impregnating compound for electrical coils comprising: 75–85% by weight of a modified asphaltite composition having a softening point of from 90–105° C.; 15–25% by weight of a wax: the mixture having a softening point of from 125°–135° C., a penetration at 25° C. with a 100 gram mass after 5 seconds of from 5 –20 mm, and a viscosity at 170° C. of from 70–125 centipoise, the asphaltite composition being gilsonite which is modified by the addition of an oil having a viscosity gravity constant greater than 0.90 and a viscosity in SSU at 100° C. of from 40 to 55 and added to the extent of from 29 to 36% by weight of the oil-gilsonite mixture.

2. An impregnant for electrical coils comprising:
45–56% by weight of gilsonite;
20–30% by weight of an aromatic process oil having a viscosity gravity constant of from 0.95 to 0.99 and a viscosity in SSU at 100° C. of from 48 to 49; and
20–25% by weight of ethylenediamine bissstearamide; the mixture having a softening point of from 125°–130° C., a penetration at 25° C. with a 100 gram mass after 5 seconds of from 7–16 mm and a viscosity at 170° C. of from 78 to 118 centipoise.

* * * * *